(12) United States Patent
Farkas et al.

(10) Patent No.: US 6,465,977 B1
(45) Date of Patent: Oct. 15, 2002

(54) SYSTEM AND METHOD FOR CONTROLLING TORQUE IN AN ELECTRICAL MACHINE

(75) Inventors: Kenneth James Farkas, Dearborn, MI (US); Vinod Reddy, Ocala, FL (US)

(73) Assignee: Ecostar Electric Drive Systems L.L.C., Dearborn, MI (US)

( * ) Notice: Subject to any disclaimer, the term of this patent is extended or adjusted under 35 U.S.C. 154(b) by 0 days.

(21) Appl. No.: 09/683,176

(22) Filed: Nov. 29, 2001

(51) Int. Cl.$^7$ ............................................... H02P 7/00
(52) U.S. Cl. ........................ 318/432; 318/701; 318/254; 318/138; 318/439
(58) Field of Search ................... 318/432, 25.1, 318/138, 439, 629, 701, 807

(56) References Cited

U.S. PATENT DOCUMENTS

| | | | |
|---|---|---|---|
| 3,974,428 A | * 8/1976 | Hafle ............................ | 318/254 |
| 4,653,004 A | 3/1987 | Osanai et al. .............. | 364/424.1 |
| 4,653,006 A | 3/1987 | Osanai et al. .............. | 364/424.1 |
| 4,658,360 A | 4/1987 | Osanai et al. .............. | 364/424.1 |
| 4,683,779 A | 8/1987 | Osanai et al. ................. | 74/861 |
| 4,743,815 A | * 5/1988 | Gee et al. ..................... | 318/254 |
| 5,890,470 A | 4/1999 | Woon et al. ................. | 123/350 |

* cited by examiner

Primary Examiner—Karen Masih
(74) Attorney, Agent, or Firm—Seed Intellectual Property Law Group PLLC (57) ABSTRACT

System and method for controlling the output torque of an electrical machine include a torque controller operable for receiving a motor input command, representative of a desired output torque, and generating a drive command to direct a motor to produce a predetermined output torque based on the motor input command. Further, the torque controller may include a sensor system for generating a feedback signal representative of an actual output torque of the motor. Additionally, the torque controller includes an input modulator and a speed modulator for adjusting the drive command based on the feedback signal and based on the motor input command to control a value of the predetermined output torque and to control a rate at which the predetermined output torque reaches the desired output torque.

23 Claims, 10 Drawing Sheets

SYSTEM AND METHOD FOR CONTROLLING TORQUE IN AN ELECTRICAL MACHINE

BACKGROUND OF INVENTION

The present invention relates to electrical machines, and more particularly, to systems and methods for controlling the torque output by an electrical machine.

An electrical machine, such as an induction motor, is capable of producing torque in response to a drive command. For example, in an electric vehicle or a hybrid electric vehicle, the drive command may be a function of the accelerator pedal position. So, as the operator of the vehicle depresses the accelerator pedal, a drive command is sent to the motor resulting in a given amount of torque being transferred through the vehicle's transmission and to the tires, where the given amount of torque depends on the accelerator pedal position. The amount of torque or change-in the torque produced by the motor affects the "drivability" of the vehicle, where the drivability is the feel and handling of the vehicle from the perspective of the operator or driver.

Further, other factors affect the drivability of the vehicle associated with the torque produced by the motor. For example, the speed and direction of travel of the vehicle, and hence the rotations per minute (rpm) and the direction of rotation of the motor, affect the torque and/or change in torque felt by the operator of the vehicle. For instance, the operator is more likely to sense a change in torque at low speeds, as opposed to high speeds, due to the inertia of the vehicle and the inertia of the motor.

Additionally, the transmission or gear ratio may affect the drivability of the vehicle associated with the torque produced by the motor. The transmission or gear ratio is the ratio of the rpm output by the motor to the rpm of tires or driving axle. For example, the drivability of a vehicle with a relatively high gear ratio is more affected by a change in motor torque than a vehicle with a lower gear ratio.

Thus, systems and methods are desired to control the amount of torque output by an electrical machine to enhance, for example, the drivability of an associated vehicle.

SUMMARY OF INVENTION

The present invention controls an output torque of an electrical machine by processing input commands and feedback signals to smoothly transition the value of the output torque to achieve the value of a desired output torque as represented by the input commands.

In one embodiment, an electrical machine, comprises: a motor operable to produce a predetermined output torque based on a drive command; a torque controller operable for receiving a motor input command and generating the drive command, the torque controller comprising an input modulator having: a hysteresis module having a predetermined hysteresis function, wherein the hysteresis module is operable for receiving the motor input command and generating a hysteresis signal according to the hysteresis function; a shaping module having a predetermined shaping function, wherein the shaping module is operable for receiving the hysteresis signal and generating a shaping signal according to the shaping function; a filtering module having a predetermined filtering function, wherein the filtering module is operable for receiving the shaping signal and generating a filtering signal according to the filtering function; and wherein the filtering signal comprises the drive command.

In another embodiment, an electrical machine, comprises: a motor operable to produce a predetermined output torque in a predetermined torque direction based on a drive command; a sensor system operable to estimate or detect an actual output torque and an actual torque direction and generate a feedback signal representative thereof; a torque controller operable for receiving a motor input command and the feedback signal and generating the drive command, wherein the motor input command represents a desired output torque and a desired torque direction, the torque controller comprising a speed modulator having: a torque analyzer operable for selecting one of a plurality of slew rates, based on the motor input command and the feedback signal, and operable for generating the drive command as a function of the selected slew rate, the motor input command and the feedback signal.

In another embodiment, an electrical machine comprises: a motor operable to produce a predetermined output torque based on a drive command; a sensor system operable to estimate or detect an actual output torque and an actual torque direction and generate a feedback signal representative thereof; a torque controller operable for receiving a motor input command and the feedback signal and generating the drive command, wherein the motor input command represents a desired output torque and a desired torque direction, the torque controller comprising an input modulator and a speed modulator; the input modulator comprises: a hysteresis module having a predetermined hysteresis function, wherein the hysteresis module is operable for receiving the motor input command and generating a hysteresis signal according to the hysteresis function; a shaping module having a predetermined shaping function, wherein the shaping module is operable for receiving the hysteresis signal and generating a shaping signal according to the shaping function; and a filtering module having a predetermined filtering function, wherein the filtering module is operable for receiving the shaping signal and generating a filtering signal according to the filtering function; the speed modulator comprises: a torque analyzer operable for selecting one of a plurality of slew rates, based on the filtering signal and the feedback signal, and operable for generating the drive command as a function of the selected slew rate, the filtering signal and the feedback signal.

In yet another embodiment, a method of controlling an amount of torque produced by an electrical machine, comprises: receiving a raw accelerator position signal (APS) representative of an actual accelerator position; receiving relative accelerator position signal representative of a change in the actual accelerator position; generating a first adjusted APS according to a predetermined hysteresis function and based on the raw APS and the relative accelerator position; generating a second adjusted APS according to a predetermined shaping function and based on the first adjusted APS, where the second adjusted APS lags or leads the raw APS; generating a third adjusted APS according to a predetermined filtering function based on the second adjusted APS, where the filtering function includes a predetermined modulation factor that varies depending upon the relative accelerator position; and controlling the amount of torque produced by the electrical machine based on a torque command, where the torque command comprises the third adjusted APS.

In yet another embodiment, a method of controlling an amount of torque produced by an electrical machine, comprises: receiving an input torque command representative of an actual accelerator position and a relative accelerator position; receiving a feedback signal representative of an actual rotational direction of a motor associated with the electrical machine; selecting one of a plurality of slew rates based on the input torque command and the feedback signal; and generating a drive command to control the amount of torque produced by the electrical machine, where the drive command is a function of the selected slew rate and the input torque command.

In another embodiment, a method of controlling an amount of torque produced by an electrical machine, comprises: receiving a raw accelerator position signal (APS) representative of an actual accelerator position; receiving relative accelerator position signal representative of a change in the actual accelerator position; generating a first adjusted APS according to a predetermined hysteresis function and based on the raw APS and the relative accelerator position; generating a second adjusted APS according to a predetermined shaping function and based on the first adjusted APS, where the second adjusted APS lags or leads the raw APS; generating a third adjusted APS according to a predetermined filtering function based on the second adjusted APS, where the filtering function includes a predetermined modulation factor that varies depending upon the relative accelerator position; receiving a feedback signal representative of an actual rotational direction of a motor associated with the electrical machine; selecting one of a plurality of slew rates based on the third adjusted APS and the feedback signal; and generating a drive command to control the amount of output torque produced by the electrical machine, where the drive command is a function of the selected slew rate and the third adjusted APS.

DETAILED DESCRIPTION

In one aspect, the present invention adjusts the output torque of a motor of an electrical machine based on the actual and relative values of an accelerator signal associated with driving the motor. For instance, the invention may adjust the output torque to lag or lead the desired torque associated with the actual and relative values of the accelerator signal. For example, for a motor having an accelerator with a short range of motion, or for a motor having a high gear ratio, the invention may cause the output torque to lag behind the desired torque to avoid abrupt changes in torque.

In another aspect, the present invention adjusts the output torque of the motor based on the actual and relative values of the accelerator signal in combination with the actual and relative values of a rotation of the motor. For instance, the invention may cause the output torque to change at a slower rate than the rate of change of the accelerator signal at slow speeds, while causing the output torque to change at a higher rate at higher speeds, because at slow speeds even small changes in torque are noticeable while even relatively large torque changes at higher speeds may not be as abrupt.

In yet another aspect, the two above-defined aspects of the invention may be combined to control the output torque of an electrical machine.

Figure 1:
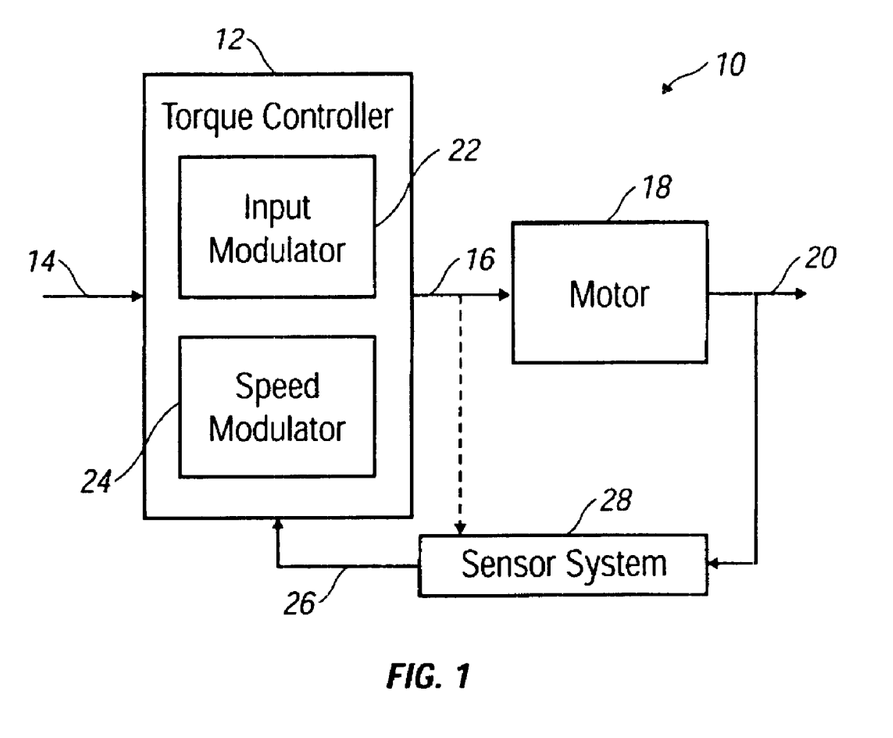
FIG. 1 is a schematic block diagram of one embodiment of an electrical machine having a torque controller.

Referring to FIG. 1, the relevant portion of one embodiment of an electrical machine 10 for producing motive forces includes a torque controller 12 for receiving a motor input command 14 and generating a drive command 16 for directing a motor 18 to produce a predetermined output torque 20. The motor input command 14 may be adjusted within the torque controller 12 by one or both of an input modulator 22 and a speed modulator 24. For example, the motor input command 14 may be a signal that represents an actual accelerator position, a relative accelerator position, and a desired rotational direction of the motor. The actual accelerator position may correspond to a desired rotational speed and/or output torque of the motor. The relative accelerator position may correspond to a change in the actual accelerator position, and thereby represents a rate of change of the desired rotational speed and/or output torque. And, the desired rotational direction may correspond to a forward mode or a reverse mode of operation of the motor. The input modulator 22 adjusts the drive command 16, and hence the output torque 18, according to predetermined instructions that are based on both the actual accelerator position and the relative accelerator position. The speed modulator 24 adjusts the drive command 16, and hence the output torque 18, according to predetermined instructions that are based on the motor input command 14 and a feedback signal 26 associated with the actual or estimated rotation of the motor 18, which may be determined by a sensor system 28. The torque controller 12 may utilize either or both of the input modulator 22 and the speed modulator 24 to determine the drive command 16 to produce a predetermined output torque 20 for a given motor input command 14. Thus, the torque controller 12 adjusts the output torque 20 based on the characteristics of the motor input command 14, based on the characteristics of the rotation of the motor 20, or based on some combination of both.

Electrical machine 10 is any machine that produces a force from electrical power and based on an input. Suitable examples of electrical machine 10 include, for example, an induction motor, a hybrid electrical motor/engine, a generator, an alternator, and any combination thereof. Although not shown, electrical machine 10 may include additional operational components, such as a power source, a transmission, an output shaft, etc.

Torque controller 12 is any device capable of driving motor 18 to produce a desired output torque 20 based on motor input command 14 and/or feedback signal 26. Suitable examples of torque controller 12 include processor units, programmable logic controllers, any type of computer, hardware, software, firmware, and combinations thereof. As is discussed in more detail below, torque controller 12 may include a number of modulators for translating a desired amount of torque associated with motor input command 14 into predetermined output torque 20.

Motor input command 14 is an input signal, as described above, that represents a desired output of motor 18 in terms of one or more of rotational speed/velocity, rotational acceleration, rotational torque and rotational direction. For example, motor input command 14 may represent the position, change of position, and/or rate of change of position of a mechanism such as an accelerator pedal and/or gear shifter that controls the output of motor 18. In this respect, the output of motor 18 includes the rotational velocity, direction, acceleration and torque.

Drive command 16 may include any signal receivable by motor 18 for use in driving or controlling the operation of the motor, including the production of output torque 20, and the rotational direction, velocity, and acceleration. As discussed above, drive command 16 is determined by torque controller 12 based on motor input command 14 and/or feedback signal 26.

Motor 18 is any device that converts energy into mechanical energy. For example, motor 18 may provide a motive force, including output torque 20, for electrical machine 10. Suitable examples of motor 18 include an electric motor, an induction motor. Motor 18 is driven by drive command 16 to produce the mechanical energy or output, such as a force, a movement, a rotation, an acceleration, a torque, etc.

Predetermined output torque 20 is an amount of torque dictated by torque controller 12 to be produced by motor 18 according to input modulator 22 and/or speed modulator 24 and based on motor input command 14 and/or feedback signal 26. Predetermined output torque 20 is a function of, and may equal, the desired torque associated with an actual accelerator pedal position, where the function varies depending on the characteristics of the motor input commands and/or the operational characteristics of the motor.

Input modulator 22 is a mechanism, which may include hardware or software, that generates drive command 16 to direct motor 18 to achieve the predetermined output torque 20 based on the motor input command 14. In general, input modulator 22 determines if the output torque 20 is to lead or lag the desired torque associated with the motor input command 14, and the rate of such a lead or lag. For example, in an electric machine having an accelerator pedal with a short travel length, or pedal modulation, small changes in the pedal position would normally have the potential for resulting in large changes in output torque. In order to smooth the output torque, input modulator 22 may cause the output torque to lag the desired torque at a time period and rate that depends on the characteristics of the input. Similarly, input modulator 22 may be utilized to create such a lag when the electric machine includes, or when the motor is connected to, a transmission having a high gear ratio. A high gear ratio transmission would normally cause an input driving the transmission to be multiplied on the output side of the transmission, which in the case of torque may cause an undesirable or uncontrollable change in torque. The input modulator thus may reduce the rate at which the output torque reaches the desired torque. Alternatively, input modulator 22 may speed up or cause the output torque to lead the desired torque in other situations, such as when dealing with high pedal modulation or low gear ratio transmissions.

When considering certain lag and lead issues and circumstances under which implementation is advantageous or required, it is important to appreciate that accelerator pedal position and movement is used to communicate the driver's desired speed and acceleration for the vehicle. The driver will usually be accustomed to the performance characteristics of vehicle powered by an internal combustion engine (ICE). As a basic premise, it is accepted that electric motors have greater capacity for torque generation in lower speed ranges, while ICEs have greater capacity for torque generation in higher speed ranges. Therefore, for enhanced drivability, the present invention includes control strategies for an electric-drive vehicle that mimic the driving characteristics of an ICE powered vehicle. In general, that means that the strategies will temperate acceleration changes indicated at the accelerator pedal when traveling at lower speeds, and enhance actual acceleration outputs based on changes to accelerator position at higher speeds. This becomes necessary because of the electric motor's capacity for high torque output in lower speed ranges and lesser output in higher speed ranges. As a result, the input from the driver at the accelerator pedal will be tempered when traveling a lower speeds so the over-power effects are not experienced. Similarly, electric motor commands based on changes to the accelerator pedal when the vehicle is traveling at higher speeds will be enhanced to better approximate the acceleration changes that would be experienced in an ICE powered vehicle for a similar accelerator manipulation.

Figure 2:
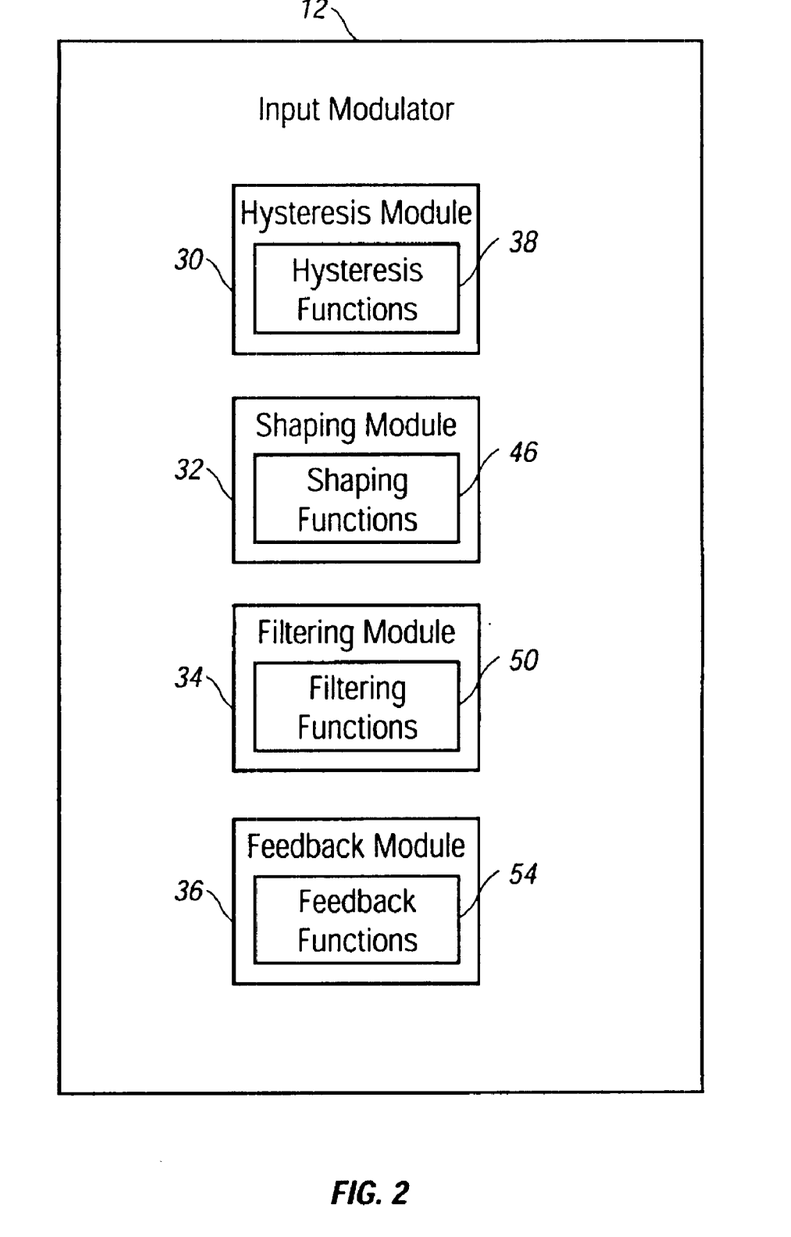
FIG. 2 is a schematic block diagram of one embodiment of an input modulator of the torque controller of FIG. 1.

Referring to FIG. 2, in one embodiment, input modulator 22 includes hysteresis module 30, shaping module 32, filtering module 34 and feedback module 36 that are utilized individually or in combination to adjust motor input command 14 to produce drive command 16. All of these modules may include hardware, software, predetermined instructions, or any other mechanism for transforming the value of the motor input command into the drive command. Hysteresis module 30 includes predetermined instructions and at least one, but preferably a plurality, of hysteresis functions 38 that may be selectively applied to an input to produce a hysteresis output. In general, hysteresis module 30 may be utilized to account for undesirable or minor variations in the input and to stabilize the output. It should be noted, however, that hysteresis modules having other characteristics may also be utilized. Additionally, hysteresis functions 38 may account for a relative change in the input and maintain or vary the output based on the relative input.

Figure 3:
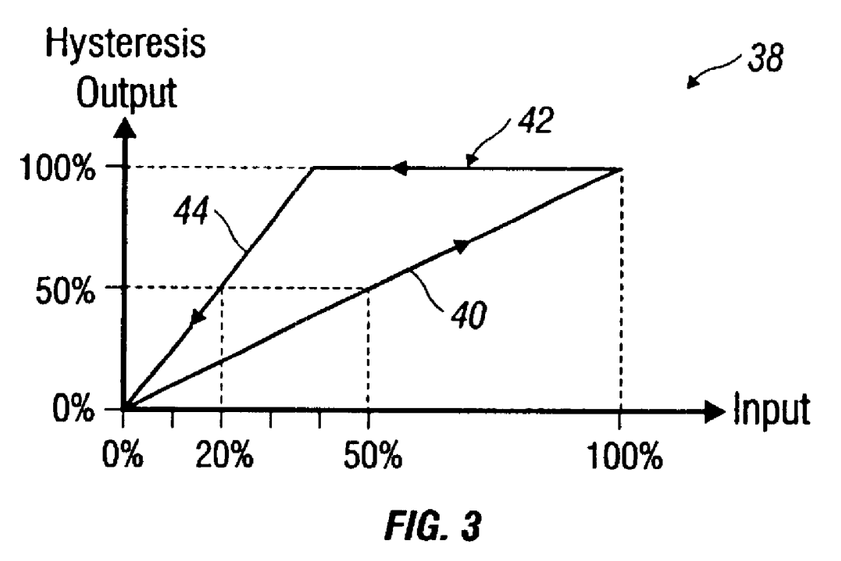
FIG. 3 is a graph of one embodiment of a hysteresis function of the input modulator of FIG. 2.

Referring to FIG. 3, for example, one embodiment of a hysteresis function 38 includes first curve portion 40, second curve portion 42 and third curve portion 44, where each curve portion is directionally oriented. For example, starting at the origin, an increasing input follows first curve portion 40, such as up to 50%, then as the input decreases it follows the appropriate second curve portion 42 until it reaches third curve portion 44, such as at 20%, which it will follow back toward the origin unless the input starts to increase again upon which it will follow a corresponding horizontal second curve portion until the first curve portion is reached. As such, for example, this particular hysteresis function produces a constant 50% hysteresis output for an input that increases to 50% but then decreases back to 20%. Of course, other functions having curve portions of a different number or slope, and which give different output results, may be utilized. Typically, the plurality of hysteresis functions 38 have predetermined characteristics in order to produce a predetermined hysteresis output for a given input based on the characteristics of the input, and the predetermined instructions of the hysteresis module 30 select the appropriate one of the plurality of hysteresis functions to apply based on the input characteristics.

Referring back to FIG. 2, shaping module 32 includes predetermined instructions and at least one, but preferably a plurality, of shaping functions 46 that may be selectively applied to an input to produce a shaping output. In general, shaping module 32 may be utilized to produce a desired lead or lag characteristic in the output based on an actual, static value or position of the input. It should be noted, however, that shaping modules having other characteristics may also be utilized.

Figure 4:
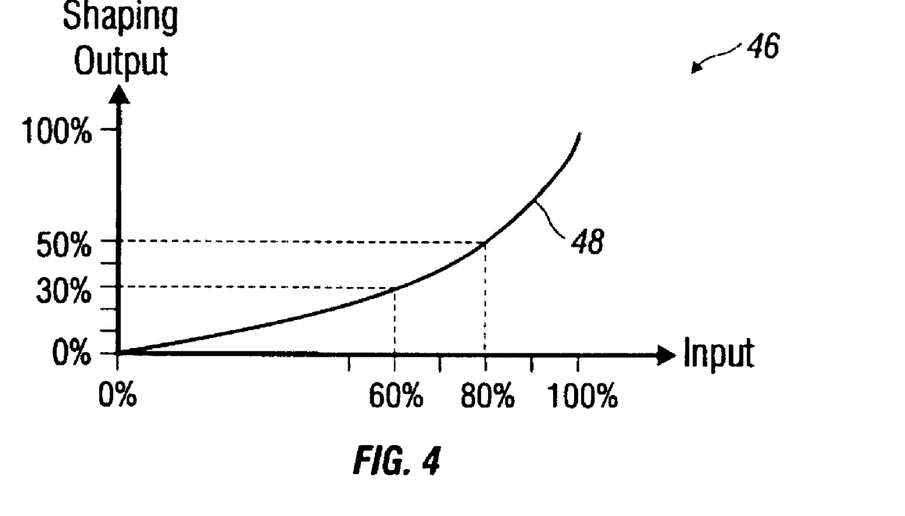
FIG. 4 is a graph of one embodiment of a shaping function of the input modulator of FIG. 2.

Referring to FIG. 4, for example, one of the plurality of shaping functions 46 includes a shaping curve 48 having any number of segments, slopes and curvatures. In this case, shaping curve 48 produces a shaping output that generally lags the input. For example, for a 80% input value, the shaping curve 48 produces a 50% shaping output value. Of course, other functions having curve portions of a different number or slope, and a giving different results, may be utilized. Typically, the plurality of shaping functions 46 have predetermined characteristics in order to produce a predetermined shaping output for a given input based on the characteristics of the input, and the predetermined instructions of the shaping module 32 select the appropriate one of the plurality of shaping functions to apply based on the input characteristics.

Referring back to FIG. 2, filtering module 34 includes predetermined instructions and at least one, but preferably a plurality, of filtering functions 46 that may be selectively applied to an input to produce a filtering output. In general, filtering module 34 may be utilized to adjust the rate of a desired lead or lag characteristic in the output based on a change in value or position of the input. In other words, filtering module 36 may be utilized to determine how quickly or slowly the filter output should achieve the desired output that is associated with the input commands. It should be noted, however, that filtering modules having other characteristics may also be utilized.

Figure 5:
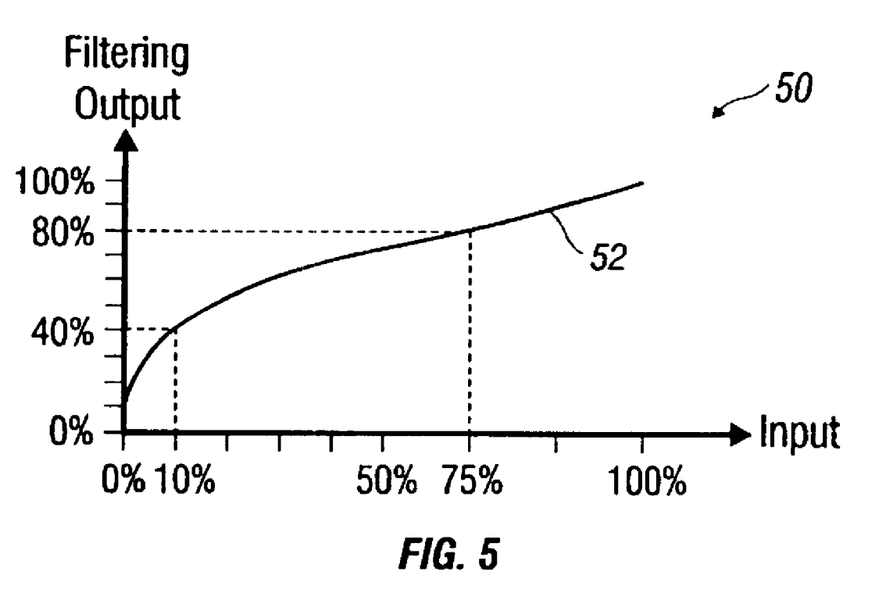
FIG. 5 is a graph of one embodiment of a filtering function of the input modulator of FIG. 2.

Referring to FIG. 5, for example, one of the plurality of filtering functions 50 includes a filtering curve 52 having any number of segments, slopes and curvatures. In this case, filtering curve 52 produces a filtering output that is more responsive to the input at lower input levels than at higher input levels. For example, at a 10% input value, the filtering curve 52 produces a 40% filtering output value, whereas for a 75% input value the filtering curve produces a 90% filtering output value. Of course, other functions having curve portions of a different number or slope, and which give different output results, may be utilized. Typically, the plurality of filtering functions 50 have predetermined characteristics in order to produce a predetermined filtering output for a given input based on the characteristics of the input, and the predetermined instructions of the filtering module 34 select the appropriate one of the plurality of filtering functions to apply based on the input characteristics.

Referring back to FIG. 2, feedback module 36 includes predetermined instructions and at least one, but preferably a plurality, of feedback functions 54 that may be selectively applied to an input to produce a feedback output. In general, feedback module 36 may be utilized to adjust or select any one of the plurality of functions associated with each one or combinations of the hysteresis module 30, shaping module 32 and filtering module 34. In general, feedback module 36 may compare outputs to inputs to adjust for change in the inputs, or may compare actual output results to desired output results to correct for errors or losses in the system. Typically, the plurality of feedback functions 54 have predetermined characteristics in order to produce a predetermined feedback output for a given input based on the characteristics of the input, and the predetermined instructions of the feedback module 36 select the appropriate one of the plurality of feedback functions to apply based on the input characteristics. A specific embodiment of one example of a feedback function will be described in more detail below.

Additionally, as will be further discussed below, each of the modules 30, 32, 34 and 36 of input modulator 22 may be used independently or in any combination, and optionally in combination with speed modulator 24, to determine drive command 16.

Figure 6:
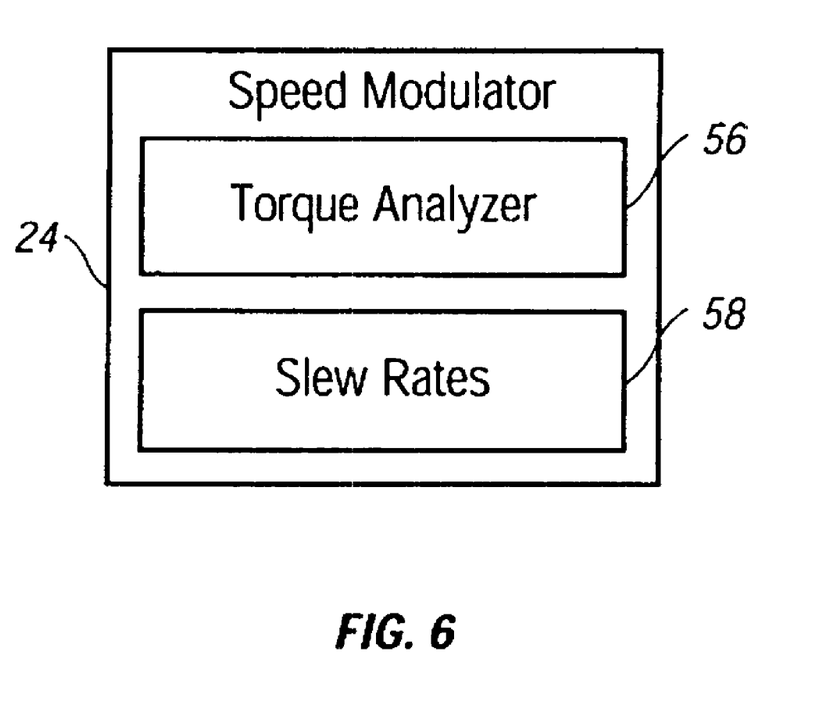
FIG. 6 is a schematic block diagram of one embodiment of a speed modulator of the torque controller of FIG. 1.

Referring to FIG. 6, speed modulator 24 is a mechanism, which may include hardware or software, that generates drive command 16 to direct motor 18 to achieve the predetermined output torque 20 based on the motor input command 14. In general, speed modulator 24 determines if the output torque 20 is to lead or lag the desired torque associated with the motor input command 14, and the rate of such a lead or lag, based on the characteristics of the motor. More particularly, speed modulator 24 deals with the motoring torque and the regenerative torque associated with electrical machine 10. Motoring torque is a positive torque, for example, the torque that propels a vehicle associated with the electrical motor in the direction of travel. Regenerative torque is a negative torque, for example, the torque that opposes propelling a vehicle in the direction of travel. In an electrical machine, regenerative torque may cause regenerative energy to be transferred back into a battery or other power supply. Motoring and regenerative torque each may also be increasing or decreasing. Speed modulator 24 includes torque analyzer 56, which includes predetermined instructions for analyzing the torque in electrical machine 10 and the desired torque associated with motor input command 14 and/or the output of input modulator 22, to determine the output torque 20. Speed modulator 24 may vary the magnitude or rate of achieving the desired torque based on the state of the motoring torque or the regenerative torque, and if the motoring or regenerative torque is increasing or decreasing. Then, based on this determination, speed modulator 24, through the predetermined instructions in torque analyzer 56, selects one of a plurality of slew rates 58 to apply to the input of the speed modulator to determine drive command 16. A slew rate, in this embodiment, may be defined as a rate at which the output reaches the input. For example, the plurality of slew rates 58 may include four slew rates: a first slew rate associated with increasing motoring torque; a second slew rate associated with decreasing motoring torque; a third slew rate associated with increasing regenerative torque; and a fourth slew rate associated with decreasing regenerative torque. The various slew rates depend on the given application, and there may be different values, or there may be similar or the same values for more that one torque characteristic. It should be noted that any number, and any combination of values of slew rates may be utilized depending on the given specifications of the electrical machine.

As such, speed modulator 24 not only utilizes motor input command 14 to determine the latest, desired output torque, but also utilizes feedback signal 26 from sensor system 28 to determine the current state of motor 18 in order to determine how to implement the input command. Sensor system 28 may be any system capable of detecting or estimating the state of the motor, such as the rotational velocity, acceleration, torque and direction, and converting such a characteristic into a feedback signal for utilization by speed modulator 24. Suitable examples of sensor system 28 include all types of encoders, accelerometers, hall-effect sensors and combinations thereof.

Figure 7:
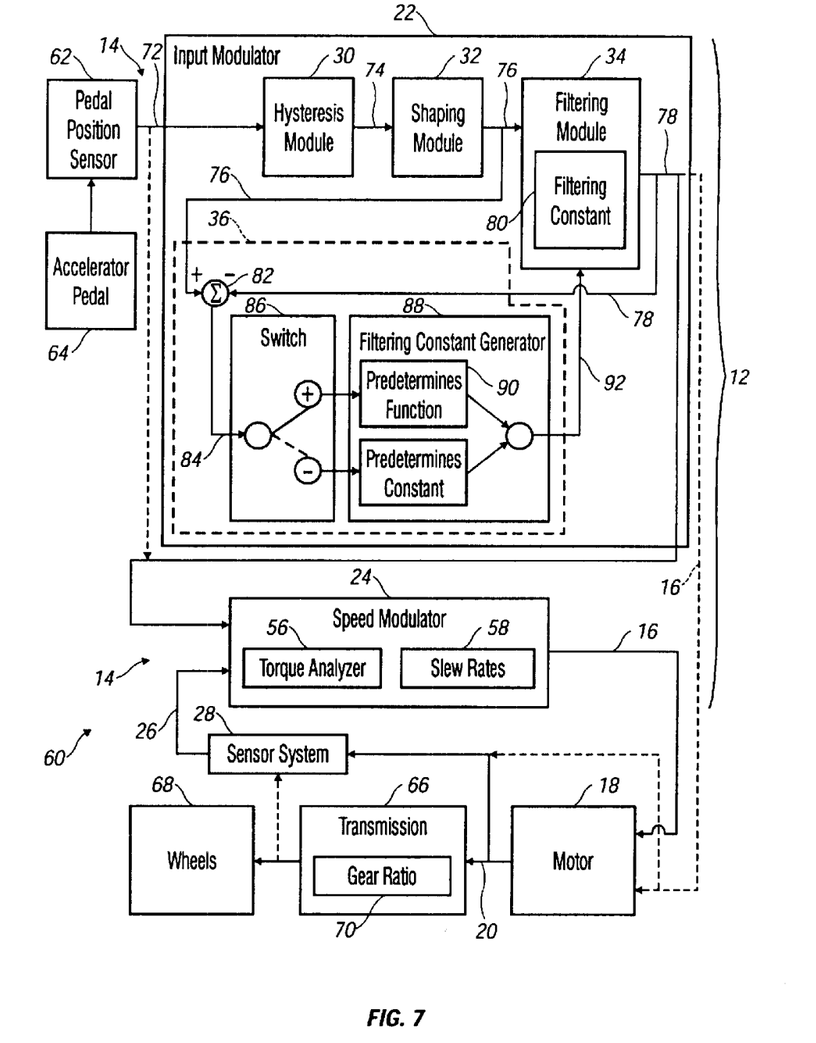
FIG. 7 is another embodiment of an electrical machine having a torque controller for controlling the output torque produced by a motor.

In operation, referring to FIG. 7 where like components have like reference numbers, another embodiment of an electrical machine 60 includes input modulator 22 and speed modulator 24 of torque controller 12 receiving motor input commands 14 from a pedal position sensor 62 that detects an actual and relative position of an accelerator pedal 64. Either individually or in combination, modulators 22 and 24 generate drive command 16 to direct motor 18 to produce output torque 20 to drive transmission 66 to rotate wheels 68 according to a gear ratio 70.

Figure 8:
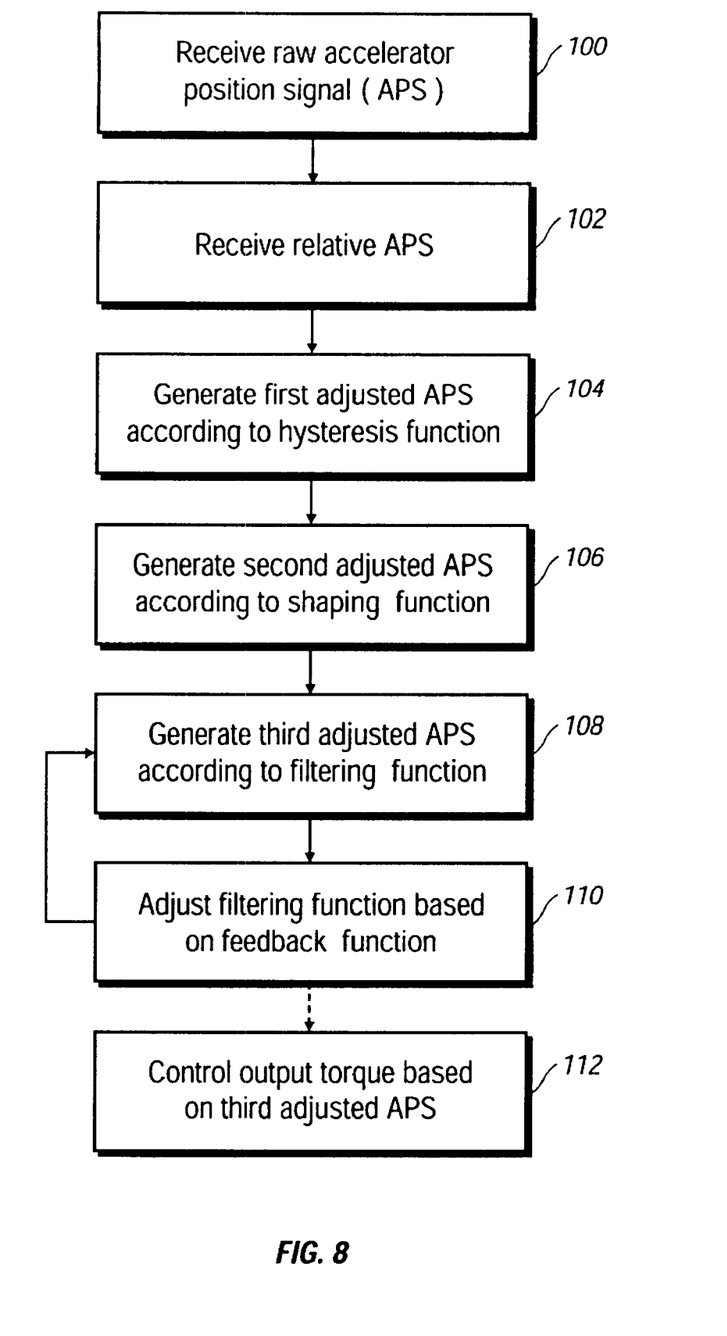
FIG. 8 is a flowchart of one embodiment of a method of controlling output torque via the input modulator of FIG. 7.

In particular, referring additionally to FIG. 8, input modulator 22 receives raw accelerator position signal (APS), which may include the actual, static position of the accelerator pedal and the dynamic, relative position or change in position of the accelerator pedal (Blocks 100 and 102). Hysteresis module 30 generates hysteresis APS 74 based on application of a predetermined hysteresis function to raw APS 72 (Block 104). Shaping module 32 receives hysteresis APS 74 and applies a predetermined shaping function to generate shaped APS 76 (Block 106). Filtering module 34 receives shaping APS 76 and applies a predetermined filtering function to generate filtered APS 78 (Block 108). The predetermined filtering function may be adjusted or changed by feedback module 36 (Block 110). For example, feedback module 36 may analyze the actual and relative signals in order to determine a filtering constant 80 to be utilized by filtering module 34. For instance, feedback module 36 may include a summing module 82 that receives shaped APS 76 associated with a new motor input command, assigning it a positive value, and filtered APS 78 associated with the most recent drive command 16, assigning it a negative value, and determines a difference APS 84. Difference APS 84 represents a relative change in the motor input command. Summing module 82 forwards difference APS 84 to switch 86, which selects a path into filtering constant generator 88 depending on the sign of difference APS 84.

If difference APS 84 is of a positive value, then filtering constant generator 88 applies a predetermined function 90 to the difference APS to determine updated filtering constant 92. For example, referring to FIG. 9, predetermined function 90 may include a predetermined curve 94, having any predetermined shape, such that inputting difference APS 84 results in updated filtering constant 92. In this particular example, for instance, a difference APS having a value between zero and $DAPS_1$ results in an updated filter constant of $FC_1$ a difference APS having a value between $DAPS_1$ and $DAPS_2$ results in an interpolated updated filter constant having a value between $FC_1$ and $FC_2$; and a difference APS having a value between $DAPS_2$ and some upper limit results in an updated filter constant of $FC_2$. It should be noted that other predetermined curves 94 may be utilized, depending on the specifications of the system.

Figure 9:
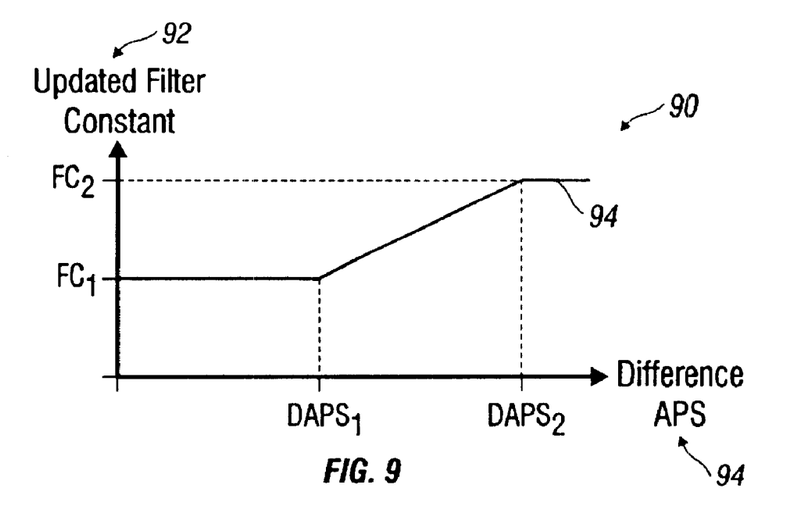
FIG. 9 is a graph of one embodiment of predetermined function for determining an updated filter constant to adjust the filtering function of FIG. 5.

If difference APS 84 is of a negative value, then switch 86 changes and filtering constant generator 88 may select a predetermined constant 96 as the updated filtering constant 92. The predetermined constant 96 may be one of the values within the predetermined function 90, or the predetermined constant may be an independent value. Thus, depending on the value of difference APS 84, an updated filtering constant 92 is determined and replaces filtering constant 80 for the forward modulation of filtered APS 78. Filtered APS 78 may optionally be utilized as drive command 16 to direct motor 18 in producing output torque (Block 112).

It should be noted that feedback module 36 in this embodiment is only one of a plurality of possible feedback modules, and that various other inputs, feedback functions, and outputs may be utilized depending on the specifications of the system. Additionally, as mentioned above, the predetermined instructions and functions associated with each module may vary depending on the specifications of the system, including the gear ratio of a transmission associated with the electrical machine, the feedback signals that may account for loss, error or change in inputs, and the characteristics of the inputs.

Figure 10:
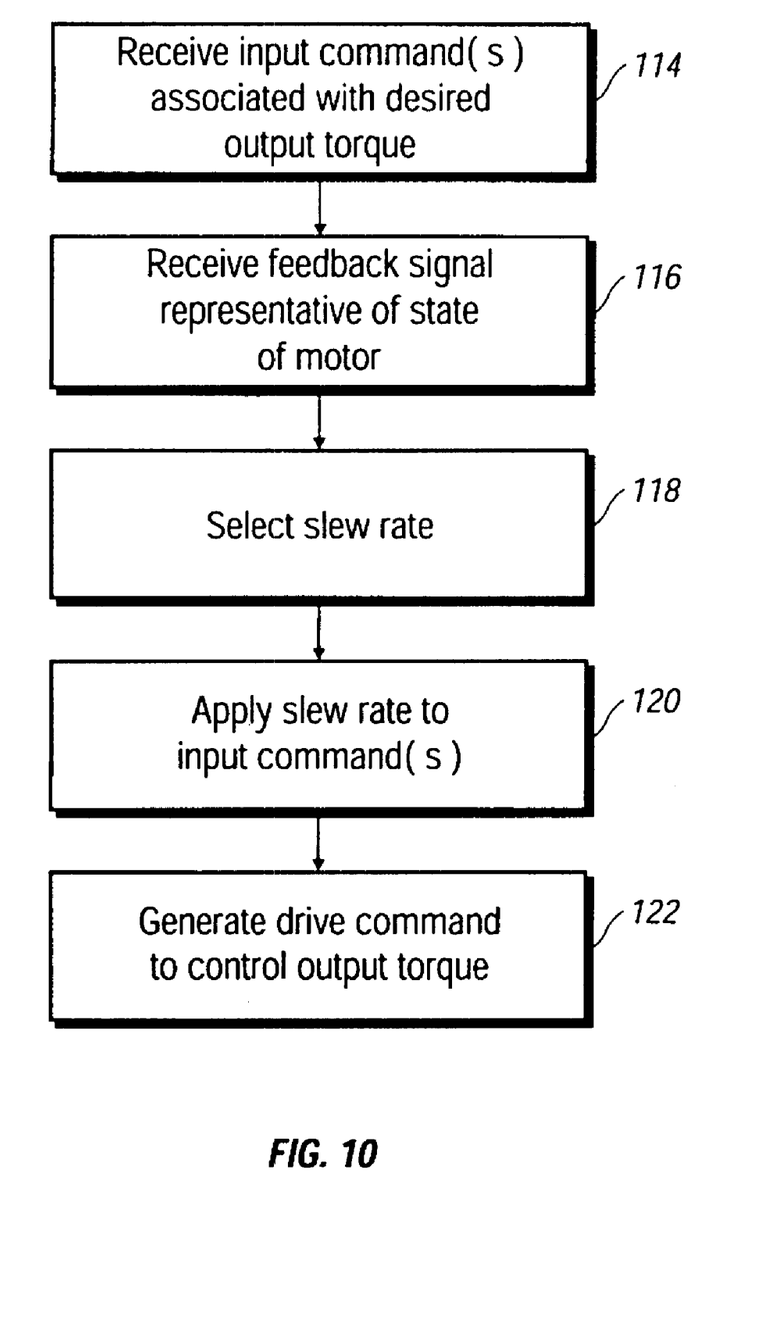
FIG. 10 is a flowchart of one embodiment of a method of controlling output torque via a speed modulator of FIG. 7.

Additionally referring to FIG. 10, speed modulator 24 may receive motor input commands 14 and generate drive command 16. In this case, motor input commands 14 may include raw APS 72, filtered APS 78, feedback signal 26, or some combination thereof. In one embodiment, speed modulator 24 receives filtered APS 78, which includes adjustments by input modulator 22 to the actual and relative accelerator pedal position signal and which further includes an indication of the desired torque direction (Block 114). Further, speed modulator 24 also receives feedback signal 26 representative of a state of the motor, transmission or wheels, including one or more of the rotational velocity, acceleration, torque and direction associated with one or more of motor 18, transmission 66 and wheels 68 (Block 116). Speed modulator 24 selects one of a plurality of slew rates 58 according to the predetermined instructions within torque analyzer 56 and based upon the aforementioned inputs (Block 118). Speed modulator 24 generates drive command 16 by applying the selected slew rate to the input commands, thereby setting the predetermined output torque 20 of motor 18.

Thus, the present invention includes systems and methods for controlling the output torque produced by an electrical machine by using various modulators, and analyzing various input commands and feedback signals, to alter the magnitude of the output torque with respect to a desired output torque and rate at which the output torque approaches the desired output torque. Such systems and methods are useful to account for variations in pedal modulation, variations in gear ratios, and variations in torque application at given velocities in order to smooth the output torque, and in at least one embodiment, to improve the drivability or handling of a vehicle associated with the electrical machine.

While the invention has been described in terms of preferred embodiments, it will be understood, of course, that the invention is not limited thereto since modifications may be made by those skilled in the art, particularly in light of the foregoing teachings.

What is claimed is:

1. An electrical machine, comprising:
   a motor operable to produce a predetermined output torque based on a drive command;
   a torque controller operable for receiving a motor input command and generating the drive command, the torque controller comprising an input modulator having:
   a hysteresis module having a predetermined hysteresis function, wherein the hysteresis module is operable for receiving the motor input command and generating a hysteresis signal according to the hysteresis function;
   a shaping module having a predetermined shaping function, wherein the shaping module is operable for receiving the hysteresis signal and generating a shaping signal according to the shaping function;
   a filtering module having a predetermined filtering function, wherein the filtering module is operable for receiving the shaping signal and generating a filtering signal according to the filtering function; and
   wherein the filtering signal comprises the drive command.

2. The electrical machine of claim 1, further comprising:
a feedback module having a predetermined feedback function, wherein the feedback module is operable for changing a function selected from the group consisting of the predetermined hysteresis function, the predetermined shaping function, and the predetermined filtering function based on the motor input command.

3. The electrical machine of claim 1, further comprising:
a feedback module having a predetermined feedback function, wherein the feedback module is operable for changing the predetermined filtering function based on the filtering signal determined from the motor input command and the shaping signal determined from a later-received motor input command.

4. The electrical machine of claim 1, wherein the motor input command comprises an accelerator position signal representative of an actual accelerator pedal position.

5. The electrical machine of claim 1, wherein the motor input command comprises an accelerator position signal representative of an actual accelerator pedal position and a relative accelerator pedal position.

6. The electrical machine of claim 1, wherein the motor input command comprises an accelerator position signal representative of a desired output torque and a desired output torque direction.

7. The electrical machine of claim 1, wherein the predetermined hysteresis function, at least in part, produces a first constant output for a plurality of variable inputs.

8. The electrical machine of claim 1, wherein the predetermined shaping function produces an output that either lags or leads an associated input.

9. The electrical machine of claim 1, wherein the predetermined filtering function adjusts a rate at which the predetermined output torque leads or lags a desired output torque represented by the motor input command.

10. An electrical machine, comprising:
a motor operable to produce a predetermined output torque in a predetermined torque direction based on a drive command;
a sensor system operable to estimate or detect an actual output torque and an actual torque direction and generate a feedback signal representative thereof;
a torque controller operable for receiving a motor input command and the feedback signal and generating the drive command, wherein the motor input command represents a desired output torque and a desired torque direction, the torque controller comprising a speed modulator having:
a torque analyzer operable for selecting one of a plurality of slew rates, based on the motor input command and the feedback signal, and operable for generating the drive command as a function of the selected slew rate, the motor input command and the feedback signal.

11. The electrical machine of claim 10, further comprising:
wherein the torque analyzer is operable to determine a motor state selected from the group consisting of increasing motoring torque, decreasing motoring torque, increasing regenerative torque and decreasing regenerative torque, wherein motoring torque is a value of output torque in a first direction and the regenerative torque is a value of output torque in a second direction opposite the first direction; and
wherein the plurality of slew rates comprise a first slew rate associated with the increasing motoring torque, a second slew rate associated with the decreasing motoring torque, a third slew rate associated with the increasing regenerative torque, and a fourth slew rate associated with the decreasing regenerative torque.

12. An electrical machine, comprising:
a motor operable to produce a predetermined output torque based on a drive command;
a sensor system operable to estimate or detect an actual output torque and an actual torque direction and generate a feedback signal representative thereof;
a torque controller operable for receiving a motor input command and the feedback signal and generating the drive command, wherein the motor input command represents a desired output torque and a desired torque direction, the torque controller comprising an input modulator and a speed modulator; the input modulator comprising:
a hysteresis module having a predetermined hysteresis function, wherein the hysteresis module is operable for receiving the motor input command and generating a hysteresis signal according to the hysteresis function;
a shaping module having a predetermined shaping function, wherein the shaping module is operable for receiving the hysteresis signal and generating a shaping signal according to the shaping function; and
a filtering module having a predetermined filtering function, wherein the filtering module is operable for receiving the shaping signal and generating a filtering signal according to the filtering function;
the speed modulator comprising:
a torque analyzer operable for selecting one of a plurality of slew rates, based on the filtering signal and the feedback signal, and operable for generating the drive command as a function of the selected slew rate, the filtering signal and the feedback signal.

13. The electrical machine of claim 12, further comprising:
a feedback module having a predetermined feedback function, wherein the feedback module is operable for changing a function selected from the group consisting of the predetermined hysteresis function, the predetermined shaping function, and the predetermined filtering function based on the motor input command.

14. The electrical machine of claim 12, further comprising:
wherein the torque analyzer is operable to determine a motor state selected from the group consisting of increasing motoring torque, decreasing motoring torque, increasing regenerative torque and decreasing regenerative torque, wherein motoring torque is a value of output torque in a first direction and the regenerative torque is a value of output torque in a second direction opposite the first direction; and
wherein the plurality of slew rates comprise a first slew rate associated with the increasing motoring torque, a second slew rate associated with the decreasing motoring torque, a third slew rate associated with the increasing regenerative torque, and a fourth slew rate associated with the decreasing regenerative torque.

15. A method of controlling an amount of torque produced by an electrical machine, comprising:
receiving a raw accelerator position signal (APS) representative of an actual accelerator position;
receiving relative accelerator position signal representative of a change in the actual accelerator position;

generating a first adjusted APS according to a predetermined hysteresis function and based on the raw APS and the relative accelerator position;

generating a second adjusted APS according to a predetermined shaping function and based on the first adjusted APS, where the second adjusted APS lags or leads the raw APS;

generating a third adjusted APS according to a predetermined filtering function based on the second adjusted APS, where the filtering function includes a predetermined modulation factor that varies depending upon the relative accelerator position; and controlling the amount of torque produced by the electrical machine based on a torque command, where the torque command comprises the third adjusted APS.

16. The method of claim 15, where the predetermined hysteresis function is selected from a plurality of hysteresis functions based on a desired difference between the raw APS and the first adjusted APS associated with a given value of the raw APS and a given value of the change in the actual accelerator position.

17. The method of claim 15, where the predetermined shaping function is selected from a plurality of shaping functions based on a desired difference between the first adjusted APS and the second adjusted APS associated with a given value of the actual accelerator position.

18. The method of claim 15, where the modulation factor is selected from a plurality of modulation factors according to a difference between the second adjusted APS and the third adjusted APS.

19. The method of claim 15, where the modulation factor is selected from a first constant modulation factor, a second constant modulation factor and a third interpolated modulation factor depending on a difference between the second adjusted APS and the third adjusted APS.

20. The method of claim 19, where a value of the first constant modulation factor is greater than a value of the second constant modulation factor, and where an increase in the value of the modulation factor decreases the lead or lag of the third adjusted APS with respect to the raw APS.

21. The method of claim 20, where a value of the interpolated modulation factor is greater than a value of the first constant modulation factor and less than a value of the second constant modulation factor.

22. A method of controlling an amount of torque produced by an electrical machine, comprising:

receiving an input torque command representative of an actual accelerator position and a relative accelerator position;

receiving a feedback signal representative of an actual rotational direction of a motor associated with the electrical machine;

selecting one of a plurality of slew rates based on the input torque command and the feedback signal; and generating a drive command to control the amount of torque produced by the electrical machine, where the drive command is a function of the selected slew rate and the input torque command.

23. A method of controlling an amount of torque produced by an electrical machine, comprising:

receiving a raw accelerator position signal (APS) representative of an actual accelerator position;

receiving relative accelerator position signal representative of a change in the actual accelerator position;

generating a first adjusted APS according to a predetermined hysteresis function and based on the raw APS and the relative accelerator position;

generating a second adjusted APS according to a predetermined shaping function and based on the first adjusted APS, where the second adjusted APS lags or leads the raw APS;

generating a third adjusted APS according to a predetermined filtering function based on the second adjusted APS, where the filtering function includes a predetermined modulation factor that varies depending upon the relative accelerator position;

receiving a feedback signal representative of an actual rotational direction of a motor associated with the electrical machine;

selecting one of a plurality of slew rates based on the third adjusted APS and the feedback signal; and generating a drive command to control the amount of output torque produced by the electrical machine, where the drive command is a function of the selected slew rate and the third adjusted APS.

* * * * *